United States Patent
Sweeney et al.

(10) Patent No.: US 9,401,854 B2
(45) Date of Patent: Jul. 26, 2016

(54) SYSTEM AND METHOD FOR SLOW LINK FLAP DETECTION

(71) Applicants: Adam James Sweeney, San Jose, CA (US); Aparna Sushrut Karanjkar, Fremont, CA (US)

(72) Inventors: Adam James Sweeney, San Jose, CA (US); Aparna Sushrut Karanjkar, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 591 days.

(21) Appl. No.: 13/890,105

(22) Filed: May 8, 2013

(65) Prior Publication Data

US 2014/0337506 A1    Nov. 13, 2014

(51) Int. Cl.
*H04L 12/26* (2006.01)
*H04L 12/24* (2006.01)

(52) U.S. Cl.
CPC ........ *H04L 43/0811* (2013.01); *H04L 41/0672* (2013.01); *H04L 43/0823* (2013.01); *H04L 43/16* (2013.01)

(58) Field of Classification Search
CPC . H04L 43/0811; H04L 43/0823; H04L 43/16; H04L 41/0672; H04L 41/0663
USPC ........................................ 709/224
See application file for complete search history.

(56) References Cited

U.S. PATENT DOCUMENTS

| 7,277,441 B1 * | 10/2007 | Mukhopadhyay .. H04M 11/062 370/395.3 |
| 7,602,726 B1 * | 10/2009 | Sundaresan ............. H04L 45/10 370/225 |
| 7,657,744 B2 * | 2/2010 | Kok ..................... H04L 63/0823 713/155 |
| 7,860,024 B1 * | 12/2010 | Greenberg .......... H04L 12/2602 370/254 |

(Continued)

FOREIGN PATENT DOCUMENTS

WO    WO 2007022238 A2 *  2/2007  .......... H04L 12/4641

OTHER PUBLICATIONS http://itknowledgeexchange.techtarget.com/network-technologies/what-is-the-link-flap-error-in-cisco-switches/ Aug. 17, 2008.*

*Primary Examiner* — Kostas Katsikis
(74) *Attorney, Agent, or Firm* — Blakely, Sokoloff, Taylor & Zafman LLP

(57) ABSTRACT

A method and apparatus of a device that monitors a link for a slow link flap event is described. In an exemplary embodiment, a device detects a link flap in a current time interval of a link that couples a pair of devices. In addition, the current time interval is one of a plurality of time intervals that are used to monitor the link for a slow link flap. Furthermore, a slow link flap event results from detecting a maximum number of link flap violations over the plurality of time intervals. The device additionally increments a number of detected link flaps for the current time interval. If the number of detected link flaps for the current time interval is greater than a maximum number of slow link flap violations, the device marks the current time interval as a possible slow link flap interval. In addition, if the total number of intervals among the current time interval and one or more preceding time intervals, which are marked as possible slow flap intervals, equals the maximum number of slow flap intervals, the device brings the link down.

20 Claims, 9 Drawing Sheets

(56) References Cited

U.S. PATENT DOCUMENTS

| | | | | |
|---|---|---|---|---|
| 7,889,666 B1* | 2/2011 | Pei | | H04L 41/065 370/242 |
| 8,170,033 B1* | 5/2012 | Kothari | | H04L 12/4641 370/395.53 |
| 8,724,517 B1* | 5/2014 | Bulusu | | H04L 45/48 370/254 |
| 8,761,029 B2* | 6/2014 | Ge | | G06F 11/0709 370/216 |
| 8,780,699 B1* | 7/2014 | Hasan | | H04L 1/22 370/219 |
| 9,197,380 B2* | 11/2015 | Shetty | | H04L 1/1867 |
| 9,262,253 B2* | 2/2016 | Jain | | G06F 11/0736 |
| 2003/0179756 A1* | 9/2003 | Cain | | H04B 7/0491 370/395.42 |
| 2003/0214914 A1* | 11/2003 | Cain | | H04B 7/0491 370/252 |
| 2004/0028018 A1* | 2/2004 | Cain | | H04B 7/2643 370/338 |
| 2004/0032847 A1* | 2/2004 | Cain | | H04B 7/2643 370/338 |
| 2004/0193964 A1* | 9/2004 | Robinson | | H04L 12/2697 714/48 |
| 2008/0062862 A1* | 3/2008 | Goyal | | H04L 45/00 370/218 |
| 2008/0215910 A1* | 9/2008 | Gabriel | | H04L 12/4641 714/4.1 |
| 2009/0049196 A1* | 2/2009 | Smith | | H04L 63/08 709/245 |
| 2009/0293046 A1* | 11/2009 | Cheriton | | G06F 8/40 717/136 |
| 2010/0131936 A1* | 5/2010 | Cheriton | | G06F 9/4438 717/146 |
| 2010/0214912 A1* | 8/2010 | Khaddam | | H04L 69/14 370/230 |
| 2010/0246384 A1* | 9/2010 | Bullappa | | H04L 43/0811 370/221 |
| 2011/0063972 A1* | 3/2011 | Muley | | H04L 12/1877 370/225 |
| 2011/0222413 A1* | 9/2011 | Shukla | | H04L 43/0811 370/241.1 |
| 2014/0006893 A1* | 1/2014 | Shetty | | H04L 1/1867 714/749 |

\* cited by examiner

SYSTEM AND METHOD FOR SLOW LINK FLAP DETECTION

FIELD OF INVENTION

This invention relates generally to data networking and more particularly to detecting a slow link flap.

BACKGROUND OF THE INVENTION

Two devices can communicate network data with each other using a link that couples the two devices, where the link can be a wired or wireless connection. This link can transport the network data while the link is in the up state. In contrast, the link cannot transport the network data if the link is in a down state. A down state can result from a reset of the port of either device coupled to the link, a reboot of one of the devices, or the port being forced down administratively using configuration commands. A problem can arise if the link transitions from the up state to the down and back again occur frequently. For example, the link can repeatedly transition from the up state to the down state and back to the up state within a short period of time. This repeated set of link transitions from an up to down to up state is known as link flapping.

There can be two kinds link flapping: a fast link flap in which there are multiple link flaps in a short period of time and a slow link flap in which there are multiple link flaps over a longer period of time. Each time the link transitions from the up state to the down state, network-based services can be disrupted and there is additional work that the service performs if the link comes back up. This disruption can lead to poor performance for the service. A fast link flap is detected by counting the number of link flaps within a short time period and determining if this number of link flaps is greater than a predetermined threshold. However, a slow link flap can still cause network disruption in network service to the point that it would be useful to detect a slow link flap event and allow a system administrator to take corrective action.

SUMMARY OF THE DESCRIPTION

A method and apparatus of a device that monitors a link for a slow link flap event is described. In an exemplary embodiment, a device detects a link flap in a current time interval of a link that couples a pair of devices. In addition, the current time interval is one of a plurality of time intervals that are used to monitor the link for a slow link flap. Furthermore, a slow link flap event results from detecting a maximum number of link flap violations over the plurality of time intervals. The device additionally increments a number of detected link flaps for the current time interval. If the number of detected link flaps for the current time interval is greater than a maximum number of slow link flap violations, the device marks the current time interval as a possible slow link flap interval. In addition, if the total number of intervals among the current time interval and one or more preceding time intervals, which are marked as possible slow flap intervals, equals the maximum number of slow flap intervals, the device brings the link down.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
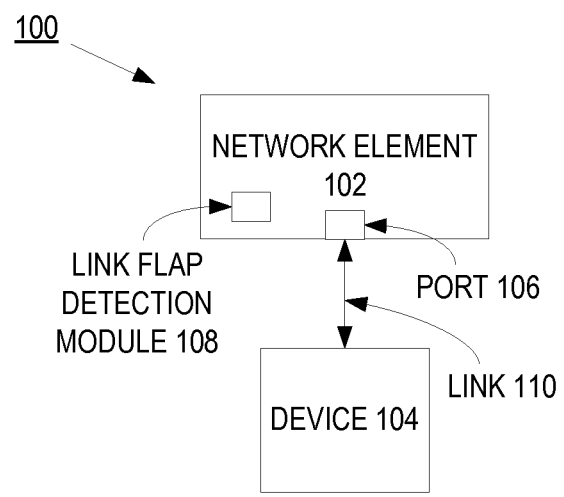
FIG. 1 is a block diagram of one embodiment of a network element that is coupled to another device and detects a slow link flap between the network element and the device.

A method and apparatus of a device that monitors a link for a slow link flap event is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that monitors a link for slow link flap event is described. In one embodiment, a slow link flap event occurs if one or more link flaps happen for some or all of the time intervals over a predetermined window of time intervals. For example and in one embodiment, a slow link flap event may occur if one link flap is detected in each of five consecutive time intervals of 10 seconds each, at least one link flap occurring in four out of five consecutive time intervals of 10 seconds each, or at least two link flap occurring in each of five consecutive time intervals of 20 seconds each. The device monitors the link for occurrences of link flaps over multiple time intervals. In one embodiment, a link flap is the transition of the link from an up state to a down state. If a link flap occurs, the device increments the number of link flaps that have occurred for the current time interval. The device further checks if the number of detected link flaps is greater than or equal to the number of maximum violations that are allowed for a time interval. If the number of detected link flaps is greater than the number of maximum violations, the device marks the current time interval as being a possible slow link flap time interval.

The device further analyzes the current and preceding time intervals over a time interval window to determine if a slow link flap event has occurred. In one embodiment, the time interval window is the number of consecutive time intervals in which a slow link flap event may occur. If the number of time intervals in this window marked as a possible slow link flap time interval is equal to a slow flap interval violation limit, the device has detected a slow link flap event. If the device detects a slow link flap event, the device takes an appropriate action (e.g., bring the link down, raise an alarm, send a notification, and/or a combination thereof).

FIG. 1 is a block diagram of one embodiment of a network element 102 that is coupled to another device 104 and detects a link flap between the network element 102 and the device 104. In FIG. 1, the system 100 includes the network element 102 that is coupled to the device 104. In one embodiment, the network element 102 is a device that provides network access to a network (e.g., physical network, virtualized network, etc.). A network element can be a switch, router, hub, bridge, gateway, etc., or any type of device that can allow access to a network. In one embodiment, the network element 102 can be a virtual machine. In one embodiment, the device 104 is any type of device that can communicate network data with another device (e.g., a personal computer, laptop, server, mobile device (e.g., phone, smartphone, personal gaming device, etc.), another network element, etc.). In one embodiment, the device 104 can be a virtual machine or can be a device that hosts one or more virtual machines.

In one embodiment, the network element 102 communicates network data with the device 104 via the port 106 using link 110. In one embodiment, the link 110 is a connection between two devices that transports network data. The link can be a wired connection (e.g., copper, optical, or other type of physical network medium), or a wireless connection. If the link 110 is the up state, the network element 102 can communicate network data with the device 104. If the link 110 is in the down state, the link 110 is unable to communicate network data between the network element 102 and device 104. A down state for the link may be because the link is in the process of coming up and is not quite able to transport network data. In one embodiment, a link flap for the link 110 is the transition of a state of the link 110 from the up state to the down state. A problem of the link flap is that the link flap disrupts services that depend on the link 110 being in the up state. For example and in one embodiment, if the device 104 using a network service via the link 110 and the network element 102 and the link 110 flaps to a down state, the service the device 104 is utilizing can be disrupted. Repeated link flapping occurs if the link 110 transitions from the up state to the down state, recovers to the up state and transitions to the down state repeatedly. In one embodiment, a further problem is if the link 110 has multiple flaps in one or more consecutive time intervals. In this embodiment, the problem is that a service that utilizes network is disrupted and there is additional work that the service performs each time the link 110 comes back up after going down. This disruption can cause poor performance for the service. In one embodiment, the network element 102 includes a link flap detection module 108 to detect fast and/or slow link flap events for link 110.

In one embodiment, the link 110 can have multiple link flaps that occur within a short time period or can have the multiple link flaps occur over a longer time period. A fast link event occurs when multiple link flaps occur in a short time period (e.g., four link flaps within 10 seconds). The network element 102 detects this event by keeping track of the number of link flaps for a given link within the configured time interval. For example and in one embodiment, if the configured time interval is ten seconds, the network element 102 can keep track of the number of link flaps for the link 110 for each ten second interval. If the number of detected link flaps is greater than a threshold, the network element will take an action to stop the fast link flap (e.g., bring the link 110 down, raise an alarm, send a notification, and/or a combination thereof).

In one embodiment, a slow link flap event occurs when the link flaps for the link 110 occur with less frequency, but enough times to cause problems with the network services that use the link 110. For example and in one embodiment, each time the link 110 flaps, services that communicate network data via link 110 may be disrupted. If the link 110 transitions from an up state to a down state, the network service may be disrupted to the point where the network service is disrupted or stopped and will need to be re-established once the link 110 returns to the up state. Thus, there can be additional work that is needed to re-establish the network service if the link 110 flaps from the up to down state and back again. While in FIG. 1, the link 110 is illustrated as coupling a network element 102 and a device 104, in alternate embodiments, the link 110 can couple two devices (e.g., link between two servers, a server that include the link flap detection module coupled to network element or other device, etc.).

Figure 2A:
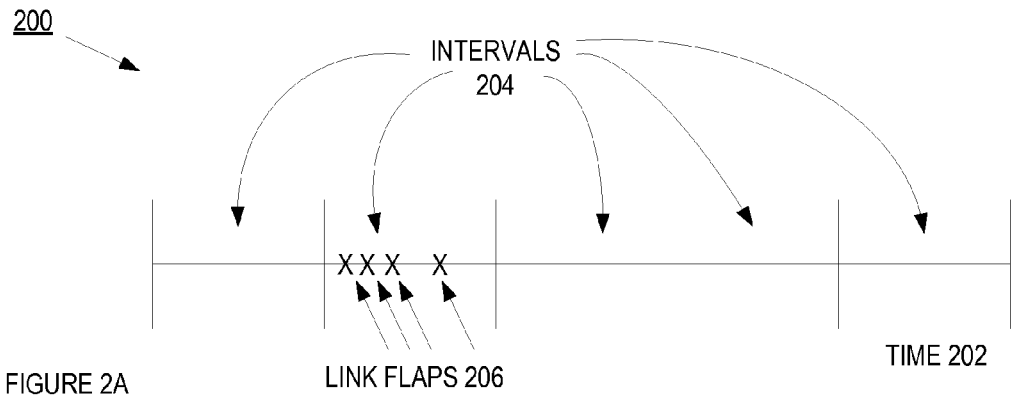
FIGS. 2A-2D are illustrations of embodiments of fast and slow link flap occurrences.
Figure 2B:
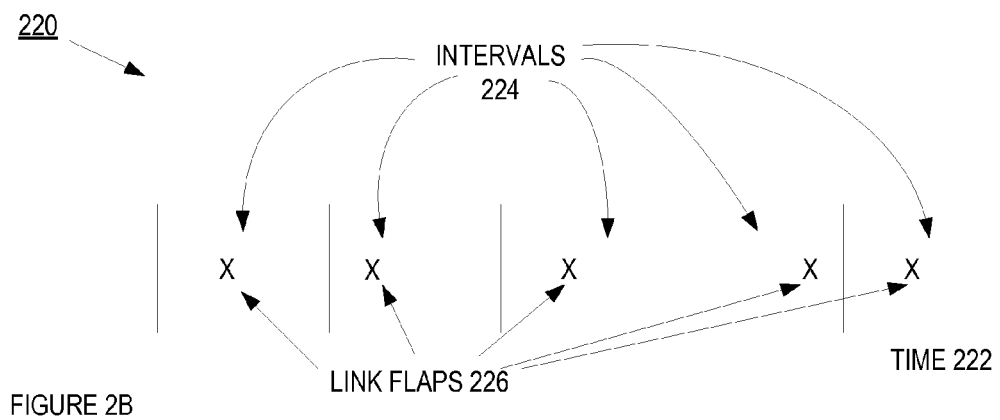
Figure 2C:
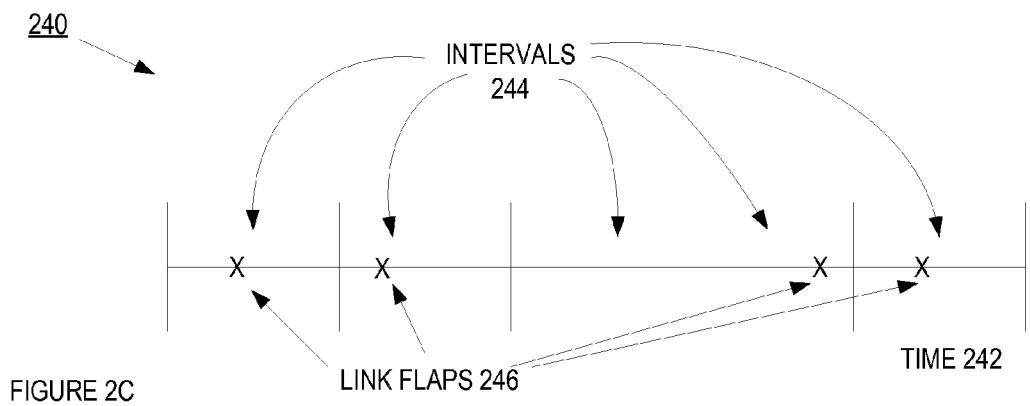

As described above, there can be a fast link flap event, in which there are multiple link flaps that occur within a short time period or a slow link flap event, in which there are low frequency link flaps that occur over a longer time period. FIGS. 2A-2C are illustrations of embodiments of fast and slow link flap occurrences. In particular, FIG. 2A is an illustration of one embodiment of a fast link flap event occurrence. In FIG. 2A, a timeline 202 is divided into multiple intervals 204. In one embodiment, each time interval 204 is a time period that is used to determine if a fast link flap event has occurred. A fast link flap event occurs when the multiple link flaps occur in one of the time intervals 204. For example and in one embodiment, five link flaps 206 are detected in the second time interval. For a network element that is configured to detect a fast link flap event when four or more link flaps occur within one time period (e.g., ten seconds), the event of five links occurring in the second time interval would trigger a fast link flap event, in which the network element would take appropriate action (e.g., bring the link down, raise an alarm, send a notification, etc.).

In one embodiment, if the network element is configured to only detect fast link flaps, the network element would not be able to detect link flaps that occur with a lower frequency and are nevertheless still harmful to the network performance. FIG. 2B is an illustration of one embodiment of a slow link flap event occurrence over multiple time intervals. In FIG. 2B, a timeline 222 is divided into multiple intervals 224. In one embodiment, each time interval 224 is a time period that is used to determine if a slow link flap event has occurred. In this embodiment, the slow link flap event occurs when there are one or more link flaps that occur in consecutive time intervals 224. For example and in one embodiment, there is one link flap 226 detected in the first five time intervals 224. For a network element that is configured to detect a slow link flap when one or more link flaps occur within each of consecutive multiple time intervals (e.g., ten seconds), the event of five time intervals that includes at least one link flap would trigger a slow link flap event. In response, the network element may take an appropriate action (e.g., bring the link down, raise an alarm, send a notification, etc.). In alternate embodiments, the threshold of link flaps for each time interval is greater than one link flap occurring in each of the time interval.

In another embodiment, the network element can be configured to detect a slow link flap based on the number of link flaps that occur in a window of time intervals. In this embodiment, one or more of the time intervals may have no detected link flaps, but the total number of time intervals that include a maximum number of link flaps is equal to or greater than a slow link flap threshold. FIG. 2C is an illustration of one embodiment of a slow link flap event occurrence over multiple time intervals, where one of the time intervals does not include a link flap occurrence. In FIG. 2C, a timeline 242 is divided into multiple intervals 244. In one embodiment, each time interval 244 is a time period that is used to determine if a slow link flap has occurred. In this embodiment, a slow link flap event occurs if there are enough time intervals 244 that include one or more link flaps. For example and in one embodiment, there is one link flap 246 detected in the first two and last two time intervals 244, where the middle time interval has no detected link flap. In one embodiment, for a slow link flap event to occur, there needs to be at least minimum number of time intervals with enough detected link flaps over a predetermined window of time intervals. For a network element that is configured to detect a slow link flap event when at least four out of the five time intervals include a link flap, the occurrence of four out of five time intervals that include a link flap would trigger a slow link event. In response, the network element may take appropriate action (e.g., bring the link down, raise an alarm, send a notification, etc.). In another embodiment, the network element could be configured to detect a slow link flap event if there are five out of ten time intervals with the requisite number of link flaps. This would allow for slow link event detection where there are alternating intervals that have link flap occurrences and those that do not.

Figure 2D:
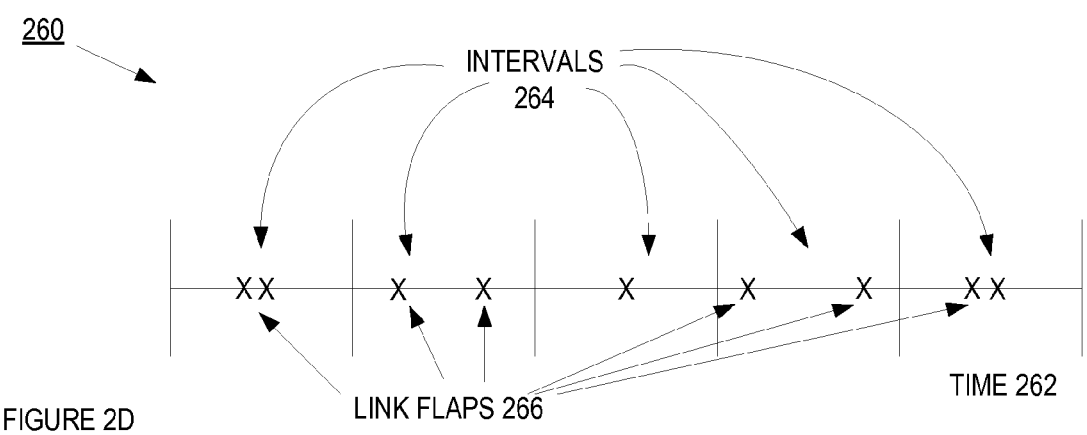

In the examples illustrated above, a slow link flap event is configured to be detected for time intervals that exhibit one link flap in the requisite number of time intervals. In another embodiment, a slow link flap event can be configured to occur exhibit more than one link flap in the requisite number of time intervals. FIG. 2D is an illustration of one embodiment of a slow link flap occurrence over multiple time intervals for time intervals that include more than one link flap occurrence. In FIG. 2D, a timeline 262 is divided into multiple time intervals 264. In one embodiment, each time interval 264 is a time period that is used to determine if a slow link flap has occurred. In this embodiment, a slow link flap occurs if there are enough time intervals 264 that include more than one link flaps (e.g., two link flaps). For example and in one embodiment, there are two link flaps 266 detected in the first two and last two time intervals 264, where the middle time interval has one detected link flap. In one embodiment, for a slow link flap event to occur, there needs to be at least minimum number of time intervals with enough detected link flaps over a predetermined window of time intervals. For a network element that is configured to detect a possible slow link flap event when at least four out of the five time intervals each include two link flaps, the event of four out of five time intervals that include two link flaps would trigger a slow link flap event. In response, the network element may take appropriate action (e.g., bring the link down, raise an alarm, send a notification, etc.).

As described above, a network element can detect either a fast and/or slow link flap event. One way to detect a slow link flap event is to widen the time interval for fast link detection so as to detect a slow link event. However, a problem with one long interval is that the network element cannot detect the spacing of the individual link flaps with that mechanism. With a single time interval, the network element might detect that the link flaps a few times quickly each time it goes down and back up, say three times in three seconds. Using a series of small intervals instead of one long interval allows the network element to detect such correlated events and classify them as individual interval failures. Without this, the network element cannot distinguish the three individual link flaps spread out over a longer interval from the three link flaps that occur all at once in our example environment.

As an alternative description, the shorter fast intervals allow the network element to group short bursts of link flaps into individual events. Without these fast intervals, the relationship among the link flaps in the burst would be lost. Each of these events can degrade network performance and network service that communicate via the link that is exhibiting a fast or slow link flap.

Figure 3:
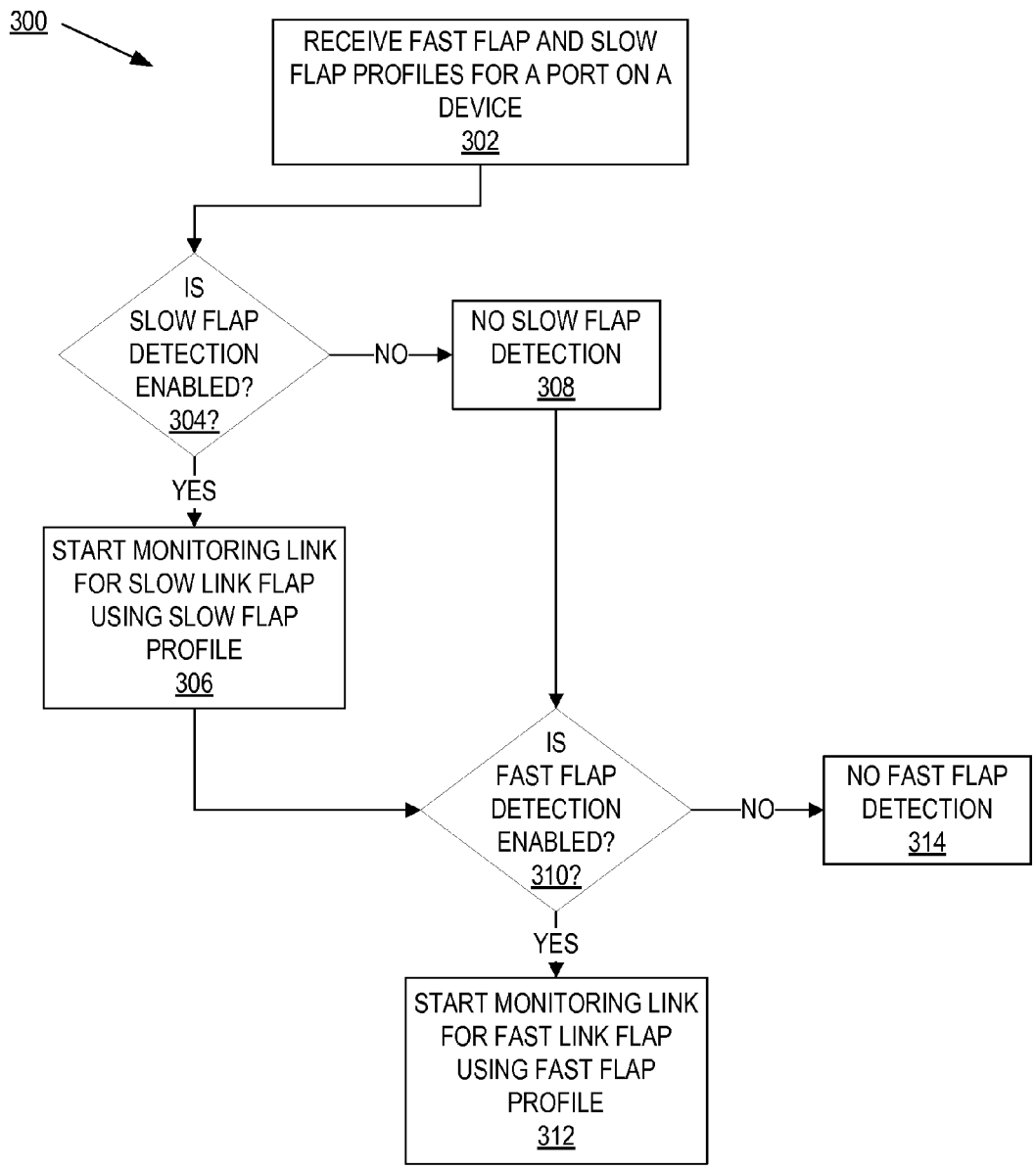
FIG. 3 is a flow diagram of one embodiment of a process to monitor a link for fast and slow link flap events.

FIG. 3 is a flow diagram of one embodiment of a process 300 to monitor a link for fast and slow link flap events. In one embodiment, a link flap detection module performs process 300 to monitor a link for fast and/or slow link flap detection, such as the link flap detection module 108 of FIG. 1 above. In FIG. 3, process 300 begins by receiving fast and/or slow link flap profiles for a port on a device at block 302. In one embodiment, a link flap profile is a set of configuration parameters that configures process 400 to monitor a link for fast and/or slow link flap events. In one embodiment, a fast link flap profile is a set of configuration parameters to configure process 400 to monitor a link for a fast link flap event. A fast link flap for a link occurs when there are multiple link flaps occurring within a single time interval. In this embodiment, a fast link profile may include configuration parameters to detect a fast link flap event for four link flaps occurring within a 10 second time interval. In another embodiment, a slow link flap profile is a set of configuration parameters to configure process 400 to monitor a link for a slow link flap event. A slow link flap event occurs is if there are a number of consecutive or non-consecutive time intervals in which one or more link flaps are detected for that link. In this embodiment, a slow link flap profile includes configuration parameters to detect a slow link flap event. For example and in one embodiment, a slow link flap event can be configured to be detect if at least one link flap occurs in five consecutive time intervals of 10 seconds each, if at least one link flap occurs in four out of five consecutive time intervals of 10 seconds each, or if at least two link flaps occur in five consecutive time intervals of 10 seconds each.

At block 304, process 300 determines if the slow link flap detection is enabled. In one embodiment, enablement of the slow link flap detection is based on the set of configuration parameters process 300 received for the slow link profile. If these set of configuration parameters indicate that the slow link flap detection is enabled, at block 306, process 300 starts to monitor the link for slow link flap events using the received slow flap link profile. In one embodiment, process 300 monitors the link for link flaps over multiple configured time intervals to determine if a slow link flap event has occurred for that link. Monitoring a link for a slow link flap is further described in FIG. 4 below. Execution proceeds to block 310. If slow link flap detection is not enabled, at block 308, process 300 does not monitor the link for slow link flap detection. Execution proceeds to block 310.

Process 300 determines if the fast link flap detection is enabled at block 310. In one embodiment, enablement of fast link flap detection is based on the set of configuration parameters process 300 received for the fast link profile. If these set of configuration parameters indicate that the fast link flap detection is enabled, at block 312, process 300 starts to monitor the link for fast link flap event using the received fast flap link profile. In one embodiment, process 300 monitors the link for link flaps over single configured time intervals to determine if a fast link flap event has occurred for that link. If fast link flap detection is not to be enabled, at block 314, process 300 does not monitor the link for fast link flap detection.

Figure 4:
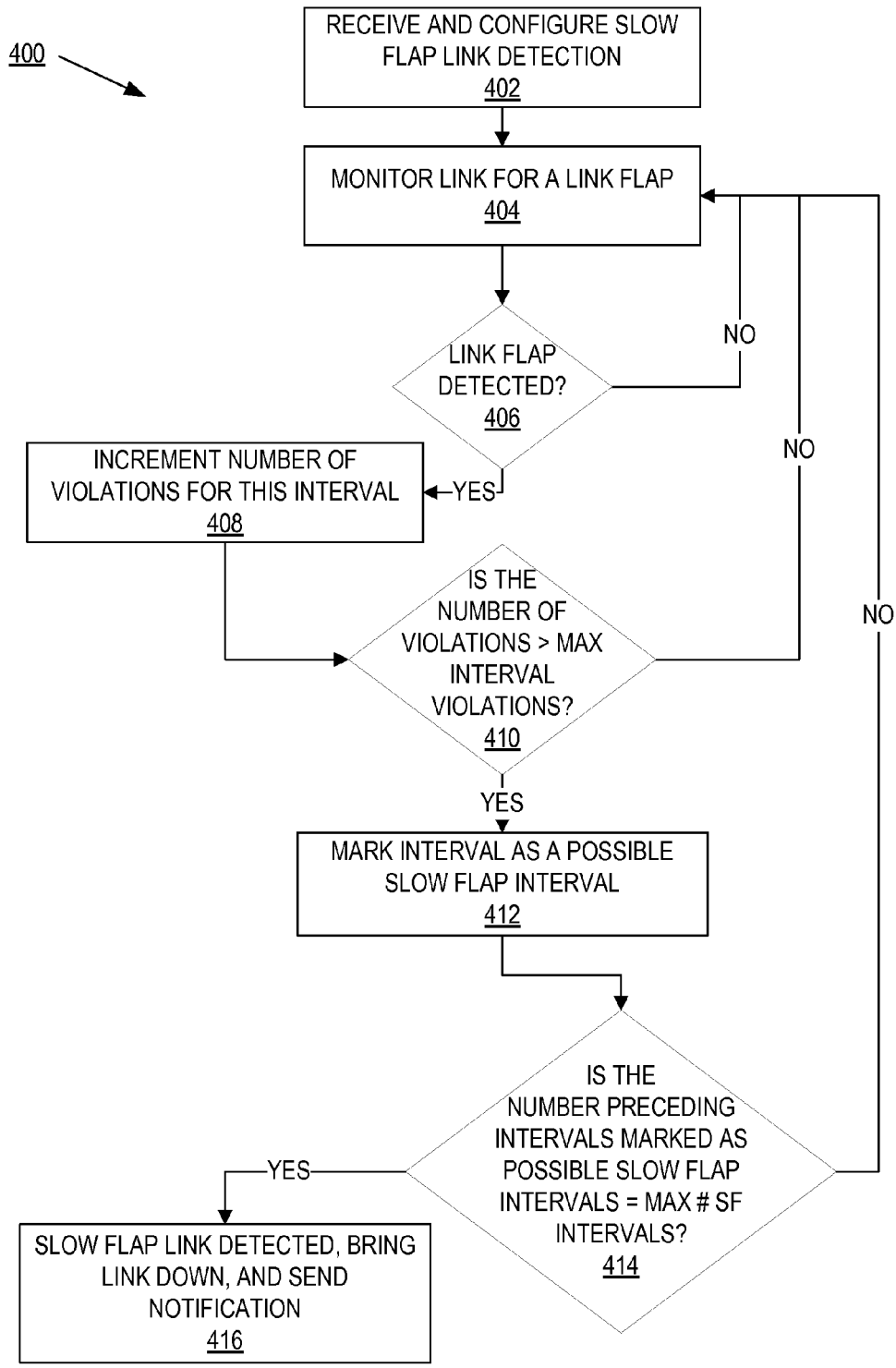
FIG. 4 is a flow diagram of one embodiment of a process to detect a slow link flap event.

FIG. 4 is a flow diagram of one embodiment of a process 400 to detect a slow link flap event. In one embodiment, process 300 performs process 400 to detect a slow link flap event at block 306 of FIG. 3 above. In FIG. 4, process 400 begins by receiving and configuring for slow link flap event detection. In one embodiment, process 400 receives a slow link flap profile and uses this profile to determine when a slow link flap event occurs for the link. For example and in one embodiment, a slow link flap profile may include configuration parameters to detect a slow link flap if there is at least one link flap occurring in five consecutive time intervals of 10 seconds each, at least one link flap occurring in four out of five consecutive time intervals of 10 seconds each, or at least two link flap occurring in five consecutive time intervals of 20 seconds each.

At block 404, process 400 monitors the link for a link flap. In one embodiment, a link flap for the link is the transition of a link state from the up state to the down state. In another embodiment, a link flap is the transition of the link from the down state to the up state, or can be a cycle of a link transitioning from the up to down to up state or a down to up to down state. At block 406, process 400 determines if a link flap has occurred for the link. In one embodiment, if a link flap is a transition from the up state to the down state, process 400 detects a link flap by detecting this link state transition. If no link flap is detected, execution proceeds to block 404. If a link flap is detected, process 400 increments the number of violations for the current time interval. In one embodiment, a violation is a link flap.

Process 400 determines if the number of violations is greater than or equal to a number of maximum violations for the time interval. In one embodiment, the number of maximum violations is a threshold that indicates that the current time interval has enough link flaps where a slow link flap may occur. If the number of violations is greater than a number of maximum violations for the time interval, process 400 marks the current time interval as a slow link flap time interval at block 410. Execution proceeds to block 412. If the number of violations is not greater than a number of maximum violations for the time interval, execution proceeds to block 404 above.

At block 412, process 400 determines if the number of current and preceding time intervals marked as possible slow link flap time intervals over a window of time intervals is greater than or equal to a maximum number of slow flap intervals. In one embodiment, the window of time intervals is the number of current and preceding time intervals that process 400 analyzes to determine if a slow link flap event is detected. For example and in one embodiment, if a slow link flap event is detected as the result of five consecutive time intervals that have been marked as possible slow link flap intervals, process 400 will analyze the current time interval and preceding four time intervals to determine if these five consecutive time intervals are marked as possible slow link flap time intervals. As another example and in another embodiment, if a slow link flap event is configured to be four out of five consecutive time intervals that have been marked as possible slow link flap time intervals, process 400 will analyze the current time interval and preceding four time intervals to determine if there are four out of the five consecutive time intervals that are marked as possible slow link flap time intervals. If process 400 detects the slow link flap event, process 400 takes an appropriate action (e.g., bring the link down, raise an alarm, send a notification, etc.) at block 414. If process 400 does not detect a slow link flap event, execution proceeds to block 404.

Figure 5:
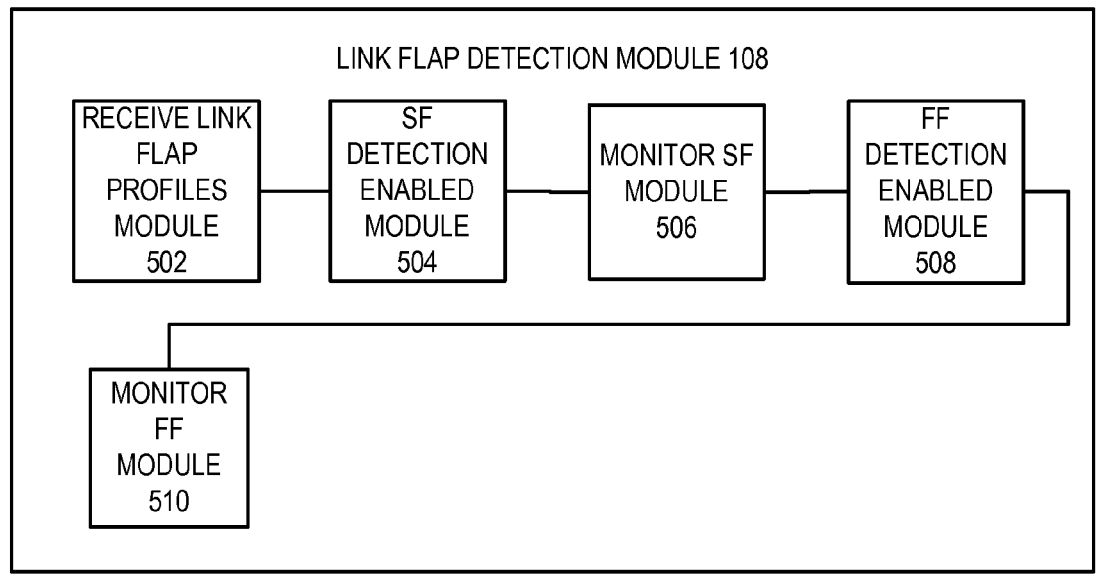
FIG. 5 is a block diagram of a link flap detection module that monitors a link for fast and slow link flaps.

FIG. 5 is a block diagram of a link flap detection module 108 that monitors a link for fast and slow link flap events. In one embodiment, the link flap detection module 108 includes a receive link flap profiles module 502, slow flap detection enabled module 504, monitor slow flap module 506, fast flap detection enabled module 508, and monitor fast flap module 510. In one embodiment, the receive link flap profiles module 502 receives the link flap profiles as described in FIG. 3 at block 302 above. The slow flap detection enabled module 504 enables slow link flap monitoring as described in FIG. 3 at block 304 above. The monitor slow flap module 506 monitors the link for a slow flap as described in FIG. 3 at block 306 above. The fast flap detection enabled module 508 enables fast flap monitoring as described in FIG. 3 at block 310 above. The monitor fast flap module 510 monitors the link for a fast link flap as described in FIG. 3 at block 312 above.

Figure 6:
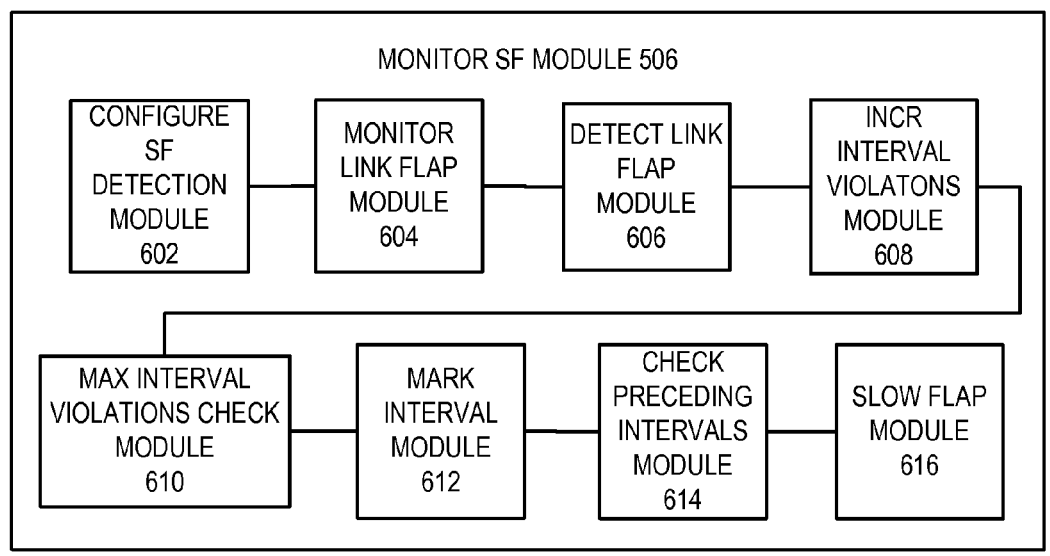
FIG. 6 is a block diagram of a monitor slow flap module that detects a slow link flap.

FIG. 6 is a block diagram of a monitor slow flap module 506 that detects a slow link flap. In one embodiment, the monitor slow flap module 506 includes a configure slow flap detection module 602, monitor link flap 604, detect link flap module 606, increment interval violations module 608, maximum interval violations check module 610, mark interval module 612, check preceding intervals module 614, and slow flap module 616. In one embodiment, the configure slow flap detection module 602 receives and configures the slow link flap detection as described in FIG. 4, block 402 above. The monitor link flap 604 monitors the link for a link flap as described in FIG. 4, block 404 above. The detect link flap module 606 determines if a link flap is detected as described in FIG. 4, block 406 above. The increment interval violations module 608 increments the number of interval violations as described in FIG. 4, block 408 above. The maximum interval violations check module 610 determines if the number of interval violations is equal to a maximum as described in FIG. 4, block 410 above. The mark interval module 612 marks the interval as a slow link flap time interval as described in FIG. 4, block 412 above. The check preceding intervals module 614 checks the preceding interval as described in FIG. 4, block 414 above. The slow flap action module 616 takes an appropriate action as described in FIG. 4, block 416 above.

Figure 7:
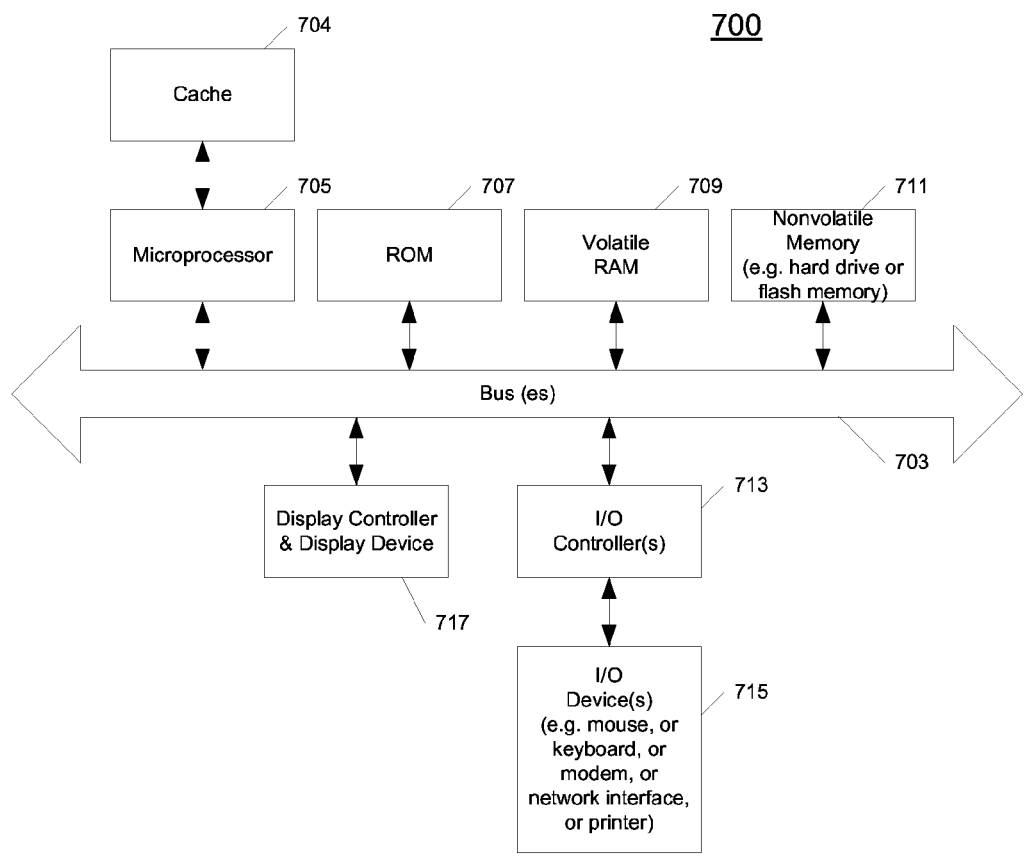
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented including a network element 102 as shown in FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 715 and to peripheral devices such as input/output (I/O) devices which may be mice, keyboards, modems, network interfaces, printers and other devices which are well known in the art. In one embodiment, the system 700 includes a plurality of network interfaces of the same or different type (e.g., Ethernet copper interface, Ethernet fiber interfaces, wireless, and/or other types of network interfaces). In this embodiment, the system 700 can include a forwarding engine to forward network date received on one interface out another interface.

Typically, the input/output devices 715 are coupled to the system through input/output controllers 713. The volatile RAM (Random Access Memory) 709 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 8:
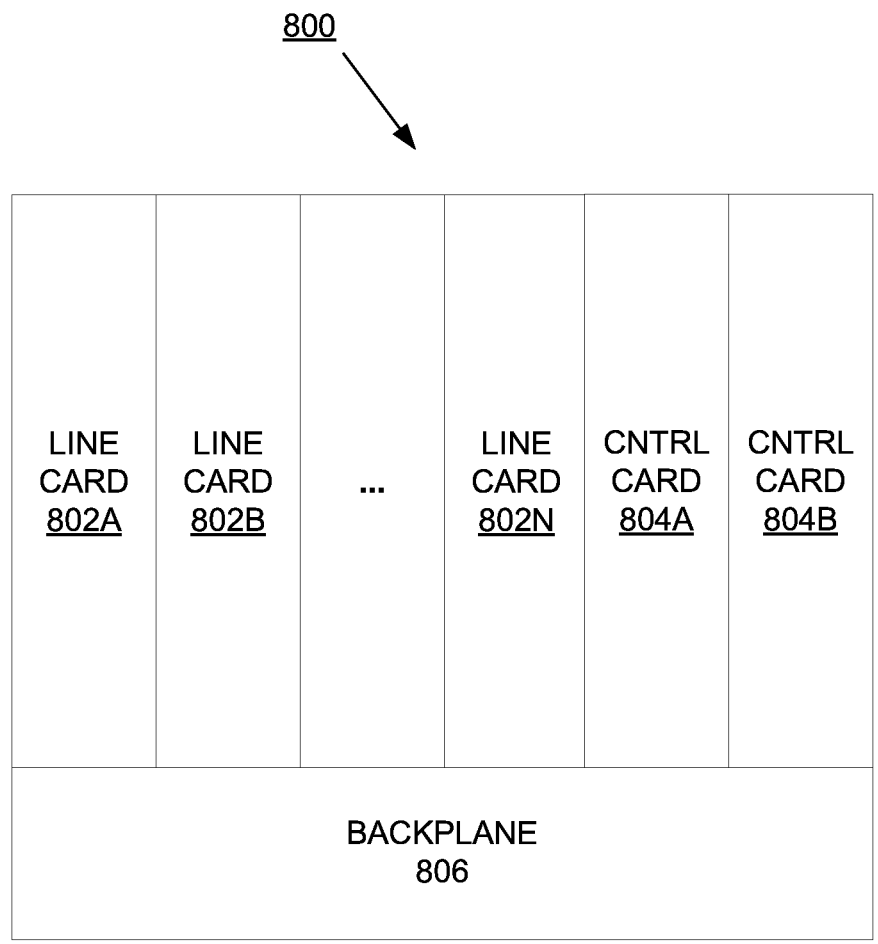
FIG. 8 is a block diagram of one embodiment of an exemplary network element that monitors a link for fast and slow link flaps.

FIG. 8 is a block diagram of one embodiment of an exemplary network element 800 that detects a slow link flap of a link over a plurality of time intervals. In FIG. 8, the backplane 806 couples to the line cards 802A-N and controller cards 804A-B. While in one embodiment, the controller cards 804A-B control the processing of the traffic by the line cards 802A-N, in alternate embodiments, the controller cards 804A-B, perform the same and/or different functions (e.g., detecting a slow link flap of a link over a plurality of time intervals, etc.). In one embodiment, the line cards 802A-N process and forward traffic according to the network policies received from controller cards the 804A-B. In one embodiment, the controller cards 804A-B detects a slow link flap of a link over a plurality of time intervals on one or more of the ports of one of the line cards 802A-N as described in FIG. 4. In this embodiment, one or both of the controller cards include the link detection module to detect a slow link flap of a link over a plurality of time intervals, such as the link detection module 108 as described in FIG. 1 above. In another embodiment, the line cards 802A-N detect a slow link flap of a link over a plurality of time intervals on one or more of the ports of the respective line card 802A-N as described in FIG. 3. It should be understood that the architecture of the network element 800 illustrated in FIG. 8 is exemplary, and different combinations of cards may be used in other embodiments of the invention.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "receiving," "determining," "transmitting," "forwarding," "bringing," "sending," "communicating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units perform a method to detect a slow link flap over a plurality of time intervals, the method comprising:
   detecting a link flap in a current time interval of a link that couples a pair of devices, wherein the current time interval is one of a plurality of time intervals that are used to monitor the link for a slow link flap and a slow link flap results from detecting a maximum number of slow link flap violations over the plurality of time intervals;
   incrementing a number of detected link flaps for the current time interval;
   if the number of detected link flaps for the current time interval is greater than the maximum number of slow link flap violations, marking the current time interval as a possible slow link flap time interval; and
   if the current time interval and a number of preceding time intervals that are possible slow link flap time intervals equals a maximum number of slow link flap time intervals, bringing the link down.

2. The non-transitory machine-readable medium of claim 1, further comprising:
   if the current time interval and a number of preceding time intervals that are marked as possible slow link flap time intervals equals the maximum number of slow link flap time intervals, sending a notification that a slow link flap has occurred for the link.

3. The non-transitory machine-readable medium of claim 2, wherein the notification is selected from the group consisting of an alarm, an alert, an email, and a log entry.

4. The non-transitory machine-readable medium of claim 1, wherein a link flap is selected from the group consisting of the link going from an up state to a down state and the link going from a down state to an up state.

5. The non-transitory machine-readable medium of claim 1, wherein the current time interval and the one or more preceding time intervals are consecutive time intervals.

6. The non-transitory machine-readable medium of claim 1, wherein the current time interval and the one or more preceding time intervals include an intervening time interval that has less than the maximum number of slow link flap violations.

7. The non-transitory machine-readable medium of claim 1, further comprising:
   if the number of detected link flaps for the current time interval is equal to a maximum number of fast link flap violations, bringing the link down.

8. The non-transitory machine-readable medium of claim 7, further comprising:
   if the number of detected link flaps for the current time interval is equal to a maximum number of fast link flap violations, sending a notification that a fast link flap has occurred for the link.

9. A method to detect a slow link flap over a plurality of time intervals, the method comprising:
   detecting a link flap in a current time interval of a link that couples a pair of devices, wherein the current time interval is one of a plurality of time intervals that are used to monitor the link for a slow link flap and a slow link flap results from detecting a maximum number of slow link flap violations over the plurality of time intervals;
   incrementing a number of detected link flaps for the current time interval;
   if the number of detected link flaps for the current time interval is greater than the maximum number of slow link flap violations, marking the current time interval as a possible slow link flap time interval; and
   if the current time interval and a number of preceding time intervals that are possible slow link flap time intervals equals a maximum number of slow link flap time intervals, bringing the link down.

10. The method of claim 9, further comprising:
    if the current time interval and a number of preceding time intervals that are possible slow link flap time intervals equals the maximum number of slow link flap intervals, sending a notification that a slow link flap has occurred for the link.

11. The method of claim 10, wherein the notification is selected from the group consisting of an alarm, an alert, an email, and a log entry.

12. The method of claim 9, wherein a link flap is selected from the group consisting of the link going from an up state to a down state and the link going from a down state to an up state.

13. The method of claim 9, wherein the current time interval and the one or more preceding time intervals are consecutive time intervals.

14. The method of claim 9, wherein the current time interval and the one or more preceding time intervals include an intervening time interval that has less then the maximum number of maximum number of slow link flap violations.

15. The method of claim 9, further comprising:
if the number of detected link flaps for the current time interval is equal to a maximum number of fast link flap violations, bringing the link down.

16. The method of claim 15, further comprising:
if the number of detected link flaps for the current time interval is equal to a maximum number of fast link flap violations, sending a notification that a fast link flap has occurred for the link.

17. A system to detect a slow link flap over a plurality of time intervals, the system comprising:
   a second device comprising a processor and memory;
   a link, coupled to the second device;
   a first device comprising a processor and memory, coupled to the link, wherein the first device detects the slow link flap on the link, the first device including,
      a port, coupled to the link, wherein the port communicates network data with the second device over the link, and
      a set of instructions that detects a link flap in a current time interval of a link that couples a pair of devices, wherein the current time interval is one of a plurality of time intervals that are used to monitor the link for a slow link flap and a slow link flap results from detecting a maximum number of slow link flap violations over the plurality of time intervals, increments a number of detected link flaps for the current time interval, if the number of detected link flaps for the current time interval is greater than the maximum number of slow link flap violations, marks the current time interval as a possible slow link flap time interval, and if the current time interval and a number of preceding time intervals that are possible slow link flap time intervals equals a maximum number of slow link flap time intervals, brings the link down.

18. A device to convert an ordered access control list to an unordered access control list, the apparatus comprising:
   a processor;
   a memory coupled to the processor though a bus; and
   a process executed from the memory by the processor to cause the processor to detect a link flap in a current time interval of a link that couples a pair of devices, wherein the current time interval is one of a plurality of time intervals that are used to monitor the link for a slow link flap and a slow link flap results from detecting a maximum number of slow link flap violations over the plurality of time intervals, increment a number of detected link flaps for the current time interval, if the number of detected link flaps for the current time interval is greater than the maximum number of slow link flap violations, mark the current time interval as a possible slow link flap time interval, and if the current time interval and a number of preceding time intervals that are possible slow link flap time intervals equals a maximum number of slow link flap time intervals, bring the link down.

19. The device of claim 18, wherein the process further causes the processor to, if the current time interval and a number of preceding time intervals that are possible slow link flap time intervals equals the maximum number of slow flap time intervals, sending a notification that a slow link flap has occurred for the link.

20. The device of claim 19, wherein the notification is selected from the group consisting of an alarm, an alert, an email, and a log entry.

* * * * *